Figures 1, 2, 3:
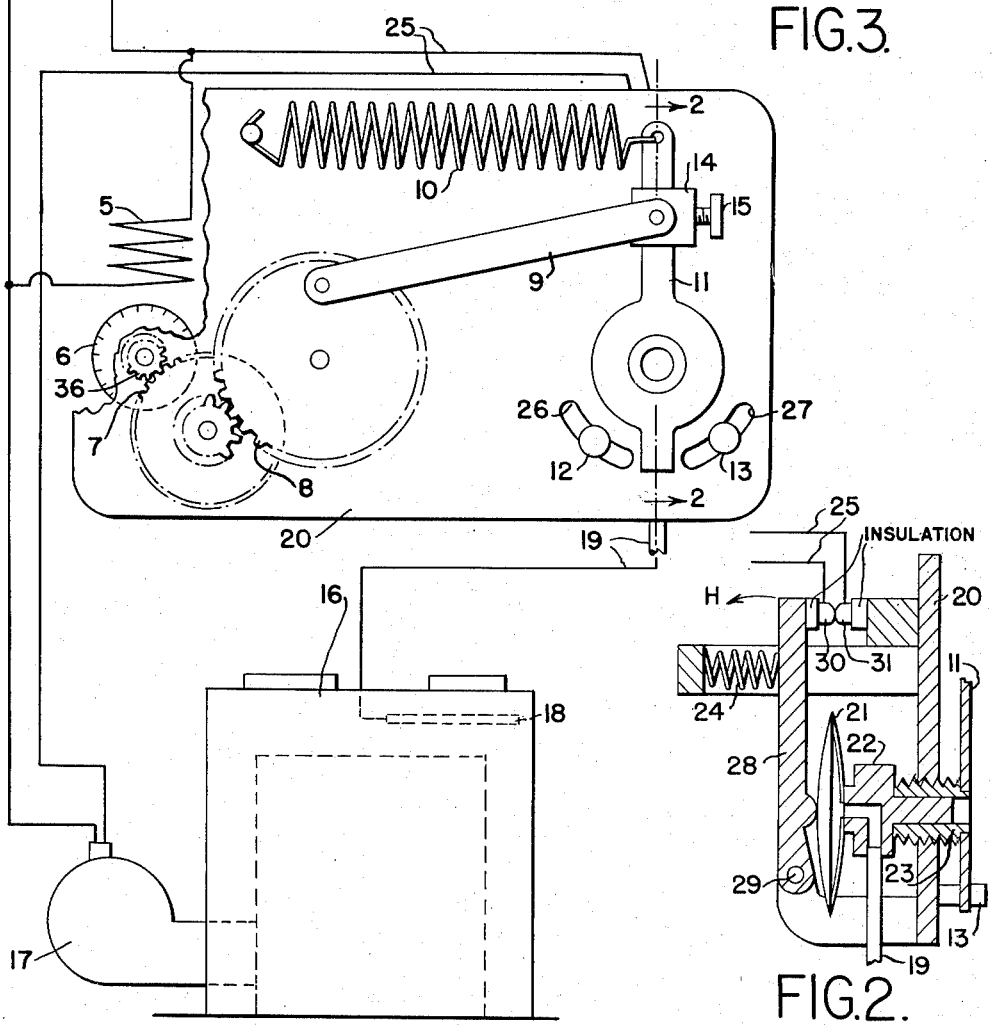

April 28, 1953

I. E. WIEGERS 2,636,682

REGULATING DEVICE

Filed July 6, 1948

INVENTOR

Irvin E. Wiegers

Patented Apr. 28, 1953

2,636,682

UNITED STATES PATENT OFFICE 2,636,682

REGULATING DEVICE

Irvin E. Wiegers, St. Louis, Mo.

Application July 6, 1948, Serial No. 37,293

2 Claims. (Cl. 236—9)

This invention relates to devices for the automatic control of phenomena such as temperature, pressure, radiation, magnetic flux, etc. It is the object of the invention to provide means for metering the output of the phenomenon producing means in such a manner as to provide desired values of the phenomenon with freedom from objectionable hunting and cycling in the controlled area. A furnace for comfort heating purposes may be considered as a specific example of such a phenomenon producing means. Such furnaces must have a heat producing capacity sufficient to insure comfort under the most extreme weather conditions that are to be encountered in the locality in which the furnace is installed. This being the case the furnace is operated only at a small fraction of its capacity during most of the heating season. To obtain constant temperature conditions with such equipment presents very difficult problems of control which are well-known in the industry. It is the object of this invention to provide means to aid in the solution of this problem.

In the accompanying drawing Figure 1 illustrates the invention and its application to a warm air heating furnace. Figure 2 is a sectional view of the thermostat mechanism of Figure 1. Figure 3 illustrates how the driving motor in Figure 1 engages the gear train when energized.

Figure 2 is a cross section of a thermostatic type switch which opens its contacts when the temperature at the bulb 18 (Figure 1) exceeds the point for which the switch is set. The bulb 18 is connected through capillary tubing 19 to the diaphragm envelope 21 and the system is filled with a liquid having the proper coefficient of volumetric expansion for this service. The diaphragm envelope 21 is secured to the stud member 22 which engages and is located by the threaded temperature adjusting bushing 23. The adjustment operating arm 11 is securely attached to the adjusting bushing 23. When the liquid in the bulb 18 expands the arm 28 is swung on the pivot 29 causing the electrical contacts 30 and 31 to open. The arm 28 is urged against the diaphragm envelope 21 by the compression spring 24.

Referring now to Figure 1, the bi-metal thermostat 3 controls the electrical input originating in the power lines 4. When the thermostat 3 makes contact the field winding 5 is energized and if the contacts 30 and 31 previously referred to are also closed, the oil burner 17 is put into operation. The field winding 5 provides magnetic flux to induce rotation in the motor armature 6 and to bring the pinion gear 36 into engagement with the gear 7 against the force of the spring 35 as shown in Figure 3. The motor armature 6 drives the crank plate 8 through the speed reducing gears 7. The crank plate 8 in turn drives the adjustment operating arm 11 through the link 9. The collar 14 may be secured at various places along the arm 11 by means of the set screw 15 and thus changes the rate at which the adjusting arm 11 is driven. The tension spring 10 is of sufficient strength so that when the field winding 5 is not energized and the motor disengaged, the mechanism is moved until the tab on the lower end of the arm 11 strikes the stop 13. The stop 13 can be adjusted to any position along the slot 27.

The thermostatic switch made up of the mechanism shown in Figure 2 and the bulb 18 in Figure 1 will hereafter be referred to as the bonnet switch, and the bi-metal thermostat 3 will be referred to as the room thermostat.

With the foregoing in mind it can be readily seen that when the room thermostat calls for heat and the furnace 16 is cool, the oil burner 17 will be put into operation. At the same time the motor field winding 5 will be excited and as previously described will slowly raise the adjustment of the bonnet switch.

The bonnet switch temperature setting and rate of rise should be so adjusted that during mild winter weather the oil burner operation will be interrupted several times before the room thermostat is satisfied. In severe weather the interruptions will be fewer because the air passing through the furnace is somewhat cooler and the automatically rising setting will allow the furnace to develop full capacity when needed. The invention thus matches the furnace output with the weather conditions.

In automatic control systems as commonly installed, the bonnet switch is used only as a safety measure and is set at a point which prevents accidental damage to the furnace but ordinarily does not function at all. With this arrangement the furnace operates at its full capacity until the room thermostat is satisfied. This causes the temperature at the room thermostat to overshoot very badly and produces marked discomfort during the time the temperature is falling to the point where the burner is again put into operation.

To prevent accidental damage to the furnace the bonnet switch is provided with a high temperature stop 12 which is adjustable along the slot 26. If the adjusting arm 11 reaches this maximum safe temperature setting the tab will strike the stop 12 and the armature 6 will be stalled until the bonnet switch is reset.

Another variation of the invention can be made by providing means for automatically adjusting the low temperature stop 13 in relation with the outdoor temperature, so that a drop in outdoor temperature raises the setting of the low temperature stop. This can be accomplished by means well known in the control industry.

With further regard to the bonnet switch, I prefer using the type having what is commonly known as adjustable "differential" (not illustrated).

Fig. 3 is intended to illustrate a principle commercially used on synchronous timing motors by which a gear train is automatically engaged when the motor is energized.

Modifications of the arrangement described and illustrated may be made within the scope of the invention which is limited only by the claims.

What I claim is:

1. In a heating system, the combination of a heat producing means, thermostatic means in the space to be heated, electrical contacts operated by said thermostatic means, temperature responsive means adjacent to said heat producing means, motor means for adjusting said temperature responsive means wired in series with said electrical contacts, biasing means resetting said temperature responsive means when said contacts are open, and additional electrical contacts operated by said temperature responsive means wired in series with the first named electrical contacts and the said heat producing means.

2. A device of the character described comprising, a phenomenon producing means, means responsive to the phenomenon controlling the output of the phenomenon producing means, adjustment means for the second named means, biasing means normally holding the adjustment means positioned for low phenomenon output, motor means capable of moving the adjustment means against the force of the biasing means to increase the phenomenon output during duration of demand, drive means for operatively connecting said motor means to said adjustment means, means for disconnecting said motor means from said drive means when demand is satisfied, and remote means sensitive to the phenomenon controlling said motor means.

IRVIN E. WIEGERS.

References Cited in the file of this patent

UNITED STATES PATENTS

| Number | Name | Date |
|---|---|---|
| 1,564,804 | Warren | Dec. 8, 1925 |
| 1,604,342 | Greenhut | Oct. 26, 1926 |
| 2,057,309 | Persons | Oct. 13, 1936 |
| 2,189,382 | McGrath | Feb. 6, 1940 |
| 2,377,551 | Harvey | June 5, 1945 |